Patented Apr. 19, 1927.

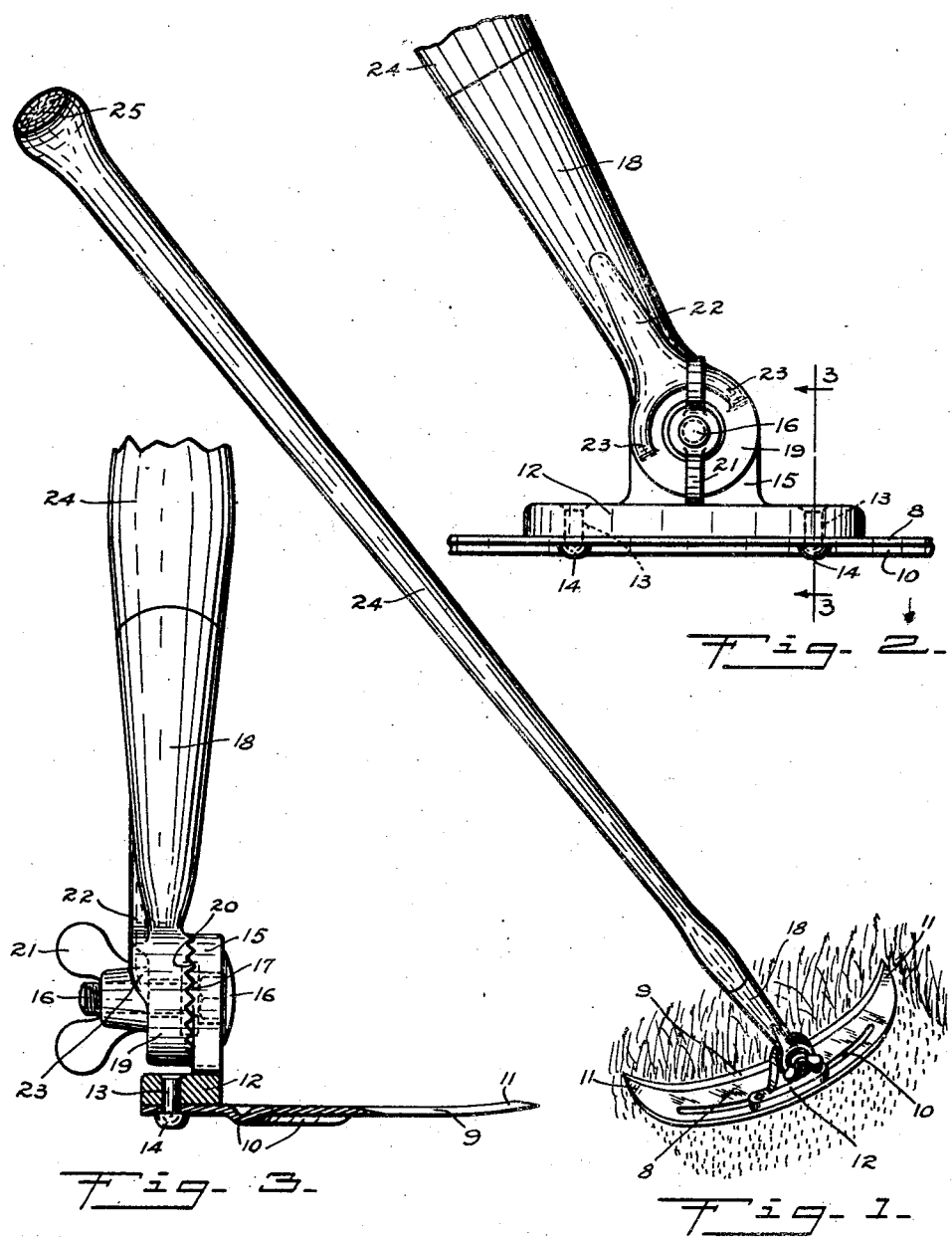

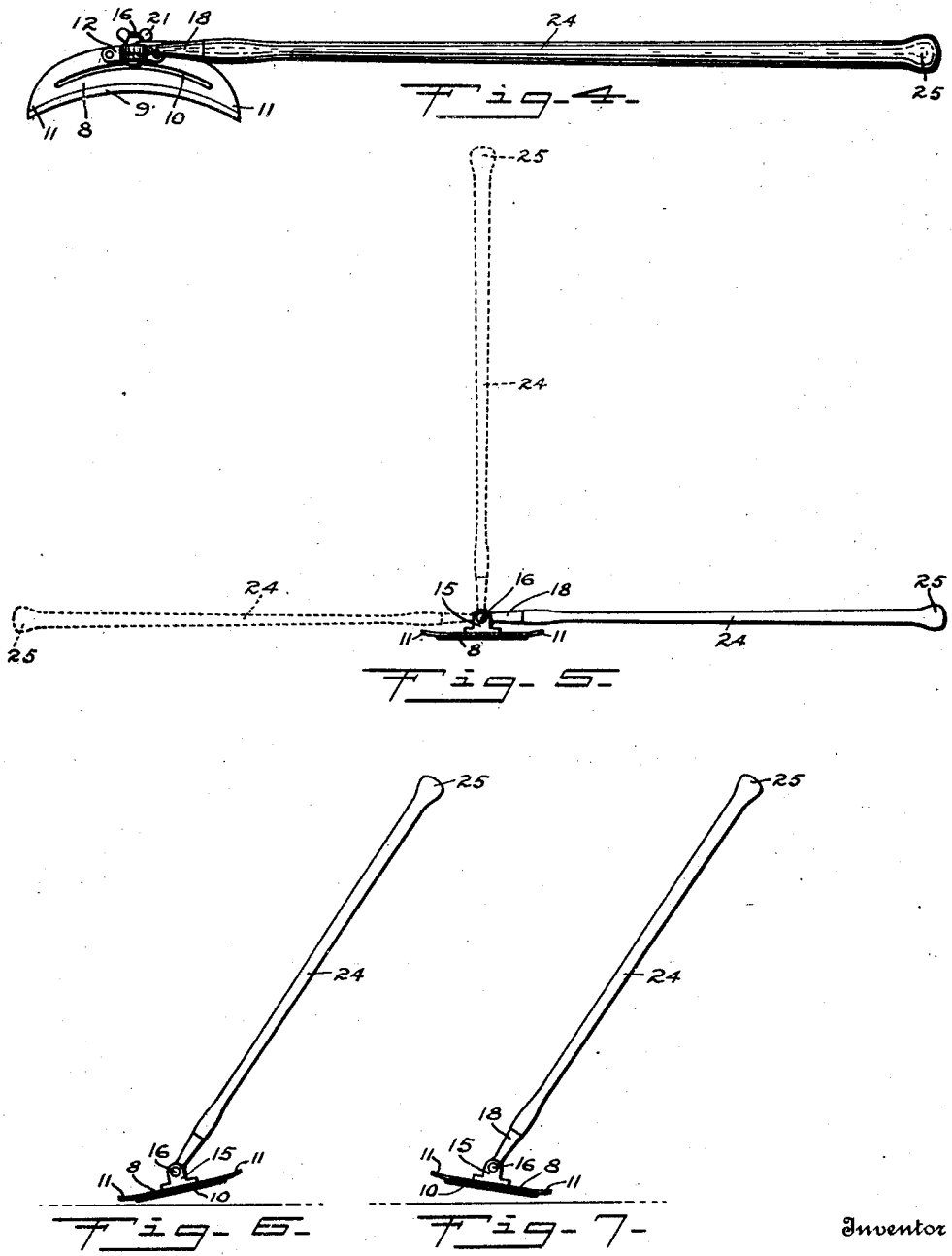

1,625,081

UNITED STATES PATENT OFFICE.

PHILIP J. HAAS, OF OMAHA, NEBRASKA.

WEED AND GRASS CUTTER.

Application filed December 29, 1922, Serial No. 609,695. Renewed September 30, 1926.

My invention relates to tools or implements of the class best represented in U. S. Patent No. 1,367,380, granted to me February 1, 1921, wherein there is provided a menisciform blade, sharpened at its concave edge, and provided with a relatively long handle which extends in a plane perpendicular to the general plane of the blade and parallel with a line between the points thereof, the handle being adjustably connected with the blade at the center near the convex edge thereof, so as to be inclinable in the perpendicular plane to various angles with the longitudinal elements of the blade.

It is the object of my present invention to provide certain specific improvements in the form of the handle, in the adjustable connecting means between the handle and the blade, and in the form of the blade itself, whereby to more perfectly adapt the implement for the cutting of vegetation on horizontal, sloping or rough surfaces, and for trimming the tops and side of hedges and the like.

In the accompanying drawings Fig. 1 is a perspective view of my improved cutter, Fig. 2 is a detail rear side view of the adjustable connecting device, Fig. 3 is a detail transverse section on the line 3—3 of Fig. 2, Fig. 4 is a plan view with the handle adjusted to a position parallel with the blade, Fig. 5 is a side view showing the extreme range of adjustments of the handle relative to the blade, and Figs. 6 and 7 are side views showing tilting angles of the blade relative to a horizontal plane.

In carrying out my invention I provide a crescent-shaped or menisciform blade 8 which is of uniform thickness except at the concave front edge 9 which is beveled at the upper side to form a sharp cutting edge continuous with the lower surface. Adjacent to the convex rear edge of the blade, and uniformly spaced therefrom, is a bead or corrugation 10 formed by downward displacement of a portion of the material, whereby there is a groove in the upper surface and a corresponding ridge upon the lower surface. The main body of the blade is flat, but the points or end-portions 11 are curved slightly upward from the plane of the body, for a purpose which will presently appear. The corrugation or bead 10 is not extended to the upturned ends 11, but terminates in the flat body-portion adjacent to said ends. Upon the upper side of the blade, adjoining the convex rear edge thereof, and positioned equidistantly from the ends, the block 12 is secured by means of rivets 13, of which the heads 14 at the lower ends thereof preferably extend below the body of the blade the same distance as the ridge formed by the bead or corrugation 10, as shown in Fig. 3. On the block 12 is an integral upstanding lug 15, having a central transverse opening to receive a bolt 16, the rear face of the lug having thereon a series of V-shaped teeth 17 which extend radially of the bolt. A metal socket-piece or ferrule 18 has a flattened head or end-portion 19 provided at one side with teeth 20 adapted to intermesh with the teeth 17 on the lug 15. Said head 19 also has a central opening for the bolt 16, and upon the threaded rear end of the bolt is screwed the wing-nut 21, by which the head and lug are clamped together in adjusted relations. The neck between the socket-piece 18 and head 19 is preferably reinforced by means of a rib 22, which is forked adjoining the head, the forked portions 23 extending around the sides at the rear face of the head, as shown in Fig. 2, so as not to interfere with the nut 21. To the ferrule 18 is connected the handle 24, which in the preferred form is made of a tough and resilient wood such as hickory. The handle is of circular cross-section throughout its length, and is symmetrical about a rectilinear axis. At its upper end there is an integral bulbous enlargement 25, and from said bulbous portion it tapers very gradually to the smallest portion or neck of the shaft, which is a short distance above the ferrule 18. The handle is relatively long, in practice it being of such length that when the blade is at the level of the ground and the handle in a moderately inclined position, the upper end of the handle may be grasped by the user without stooping or bending of the body.

In the use of the implement the blade and handle are adjusted to various angular relations according to the kind of work to be done, and the convenience of the user. Thus, for cutting grass or the like upon a substantially level surface, the blade and handle are adjusted to an angular relation approximately as shown in Figs. 1, 6 and 7, the exact adjustment being suited to the height of the user, or so that the upper portion of the handle may be conveniently grasped with both hands when the blade lies flat upon or parallel with the surface of the ground and but slightly raised therefrom. As shown in said figures the implement is adapted for use by a righ-handed person, but by reversing the inclination of the handle the same is placed at a corresponding position for use by a left-handed person. The angular adjustments are effected by merely loosening the wing-nut 21 sufficiently to enable the intermeshing teeth 17 and 20 to slip past each other during relative rotation of the lug 15 and head 19 about the axis of the bolt, and again tightening the nut when the parts are in the desired relation, to hold the teeth firmly intermeshed. For use in trimming the tops of hedges or the like, and sometimes for cutting heavy weeds, the handle is adjusted to the extreme position shown in Figs. 4 and 5, at which the axis of the handle is parallel with the plane of the blade. The dotted outline at the left of Fig. 5 indicates the position of the handle for use by a left-handed person, corresponding with the right-handed position shown by the full lines at the right of the figure. For trimming the sides of hedges, or in any analogous situation requiring cutting in a substantially vertical plane, the handle may be placed at the relative position indicated by the intermediate dotted outline thereof in Fig. 5.

When the implement is used in the ordinary adjustment thereof shown in Fig. 1, the bulbous upper end-portion 25 of the handle is grasped with the left hand, the end of the bulb being partly within the palm of said hand, the thumb and forefinger encircling diagonally the lower portion toward the shaft, and the right hand grasping the shaft immediately below the left-hand. With the implement so held it is swung transversely across the front of the body, the handle being at such an angle that the blade is substantially parallel with the ground during the middle portion of the stroke. The extent of the swing is proportioned to the force required to cut the grass or other vegetation, during the effective or working portion of the stroke. For very coarse or tough vegetation it may be desirable to swing the cutter up over the shoulder at the beginning of the stroke, whereby to accumulate a considerable momentum of the blade prior to the moment when it strikes the material to be cut, the motion and control of the cutter in this case being very similar to the stroke of a golf club in driving. The major portion of the swinging movement of the cutter is effected by motion of the arms and wrists, but, by a moderate swinging or pivotal movement of the body at the waist, the blade of the cutter may be caused to move substantially parallel with the ground for a considerable distance, so that the vegetation may be cut at a uniform height. It will be seen that the provision of the bulbous enlargement 25 at the upper end of the handle greatly facilitates the control of the cutter, enabling the handle to be held for a continued period without fatigue, and inducing the user to grasp the handle at the extreme end so as to most effectively utilize the momentum of the blade in overcoming the resistance of the material to be cut. The ridge formed upon the lower side of the blade by the corrugation or bead 10, serves as a gage or guide-shoe to prevent the cutting edge of the blade approaching too close to the ground, and the corrugation also stiffens and reinforces the blade. The heads 14 of the rivets 13 also serve to some extent as a guide-shoe.

Referring to Fig. 6, the blade of the cutter is shown in the relation to a horizontal surface which it assumes at the middle of the cutting stroke when the user is standing too close to the area of cutting, so that the outer end of the blade is closer to the ground than the inner or adjacent end. The reverse situation is represented in Fig. 7, wherein the outer end of the blade is more elevated than the inner or adjacent end, such a position of the blade resulting from swinging the same too far out from the point at which the user is standing. Obviously, at either of such extreme positions the lower end or point of the blade is apt to strike the ground, and it is to minimize such a tendency that the points or end-portions 11 of the blade are curved upwardly, as hereinbefore mentioned. The tilting of the blade is somewhat exaggerated in said Figs. 6 and 7, as the user will seldom swing the cutter either so close to or so far out from the point at which he stands as to incline the blade to the extent represented in said figures. The upward curvature of the blade at the ends 11 is, therefore, very effective in preventing the points of the blade from striking the ground as a result of slight deviations from the normal swing of the cutter.

Now, having described my invention, what I claim and desire to secure by Letters Patent is:

1. An implement of the class described, comprising a crescent-shaped blade having its concave edge sharpened, the main body of the blade being substantially flat and the ends having an upward curvature from the plane of the main body, a member secured on the upper side of the blade adjoining the rear convex edge thereof and equidistant from the ends, said member having an upstanding lug extending longitudinally of the blade, a relatively long straight handle having a bulbous enlargement at its upper end, said handle being connected at its lower end with said upstanding lug and adjustable pivotally about an axis transverse to said lug, whereby said handle is constantly in a plane perpendicular to the plane of the main body of the blade and parallel to a line between the points thereof, and means for securing the handle in fixed relation to the blade at variously adjusted positions in said perpendicular plane.

2. In an implement of the class described, the combination with a crescent-shaped blade having its concave edge sharpened and its end portions curved upwardly from the plane of the main body thereof of a long straight handle provided at its upper end with an integral bulbous enlargement, and means for securing the lower end of said handle to the central portion of said blade adjoining its rear convex edge, said handle extending in a plane perpendicular to the plane of the body of the blade and longitudinal of its sharpened edge.

PHILIP J. HAAS.